Patented Apr. 21, 1925.

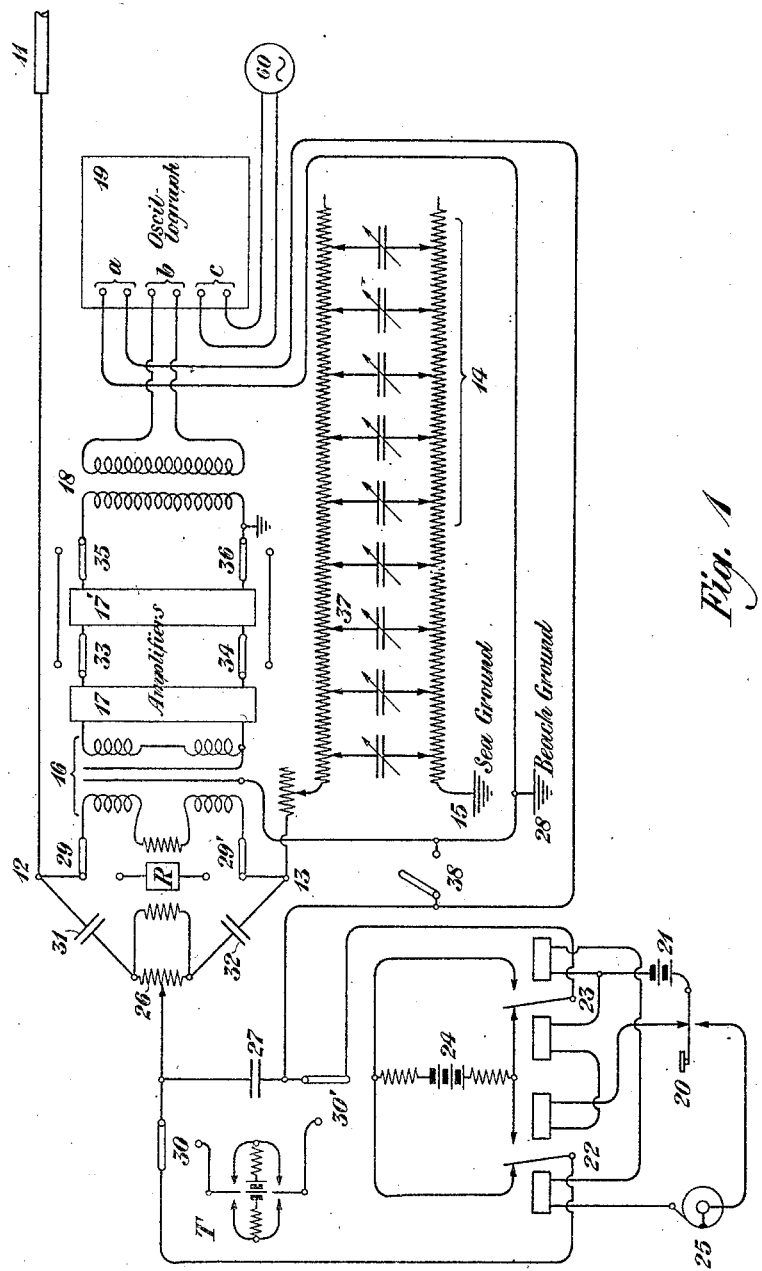

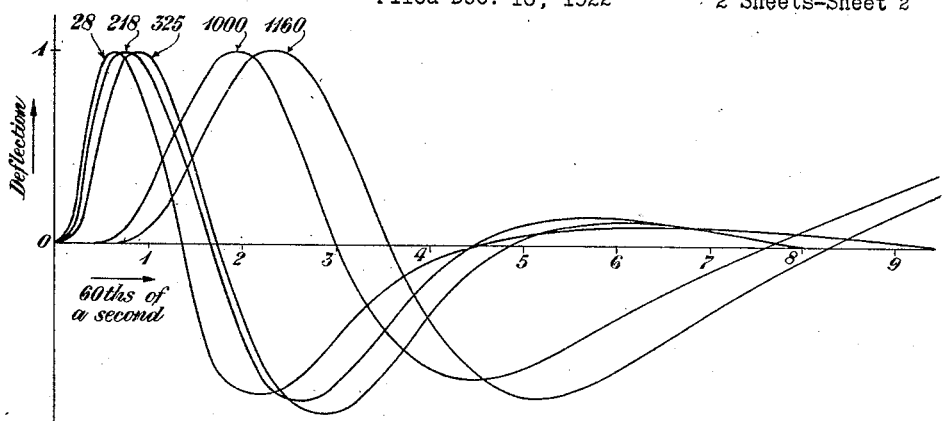
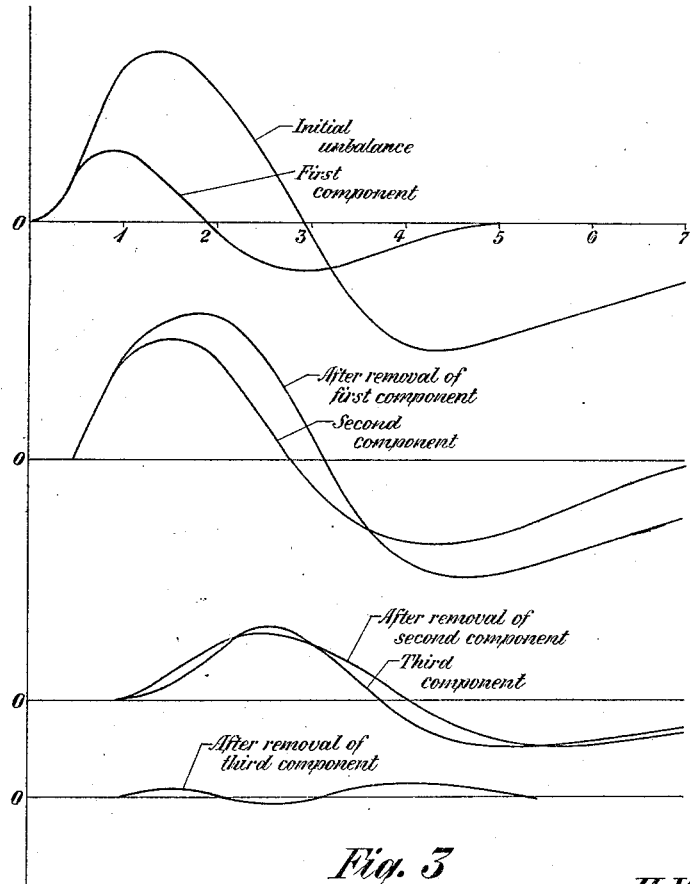

1,534,118

UNITED STATES PATENT OFFICE.

HARRY W. HITCHCOCK, OF BERKELEY, CALIFORNIA, ASSIGNOR TO AMERICAN TELEPHONE AND TELEGRAPH COMPANY, A CORPORATION OF NEW YORK.

METHOD OF ADJUSTING BALANCE BETWEEN ELECTRICAL CONDUCTORS OR NETWORKS.

Application filed December 16, 1922. Serial No. 607,422.

*To all whom it may concern:*

Be it known that I, HARRY W. HITCHCOCK, residing at 2229 Marin Ave., Berkeley, in the county of Alameda and State of California, have invented certain Improvements in Methods of Adjusting Balance Between Electrical Conductors or Networks, of which the following is a specification.

It is an object of my invention to provide a new and improved method of effecting an adjustment of the balance between a signaling conductor and an artificial line. Another object of my invention is to provide a method of adjusting an artificial line so that it shall simulate a given signaling conductor. Other objects of my invention relate to effecting such adjustment in a convenient manner and in making the adjustment quickly and keeping the signaling conductor out of service for only a very short time. All these objects of my invention and other objects will be made apparent in the following disclosure of an example of practice in accordance with the invention. It will be understood that the invention will be defined in the appended claims.

Referring to the drawings, Figure 1 is a diagram of apparatus. Figure 2 shows some type unbalance curves; and Figure 3 shows the steps in an analysis of a normal unbalance curve into type unbalance component curves.

The submarine cable 11 and the artificial line or network 14 are connected, respectively, at the opposite points 12 and 13 of the bridge. In normal use, the switches 29, 29', 30, 30' and 38 are thrown from the positions shown in Fig. 1 and connect the receiver R across the points 12 and 13 and the transmitter T (in shunt to the condenser 27) between the apex 26 and ground 28. Assuming that the network 14 simulates the cable 11, and that proper adjustment is made at the apex 26, transmitted impulses from T will produce equal potentials at 12 and 13 and hence will have no effect on the receiver R. On the other hand, received current coming in over the line 11 will divide at 12 and part of them will go through the receiver R and produce an indication therein. The accurate and efficient duplex working of the system requires that the artificial line 14 shall closely simulate the cable 11; otherwise transmitted impulses from T will produce an effect in the receiver R which will more or less mask the received impulses coming in over the cable 11.

In order to practice my improved method of adjusting the artificial line 14, I have provided the apparatus shown, which in normal use is disconnected at the switches 29, 29', 30, 30' and 38. When an adjustment is to be made, these switches are thrown to the positions shown in Fig. 1 and the apparatus is operated in the manner now to be described.

The key 20 is normally closed on its upper contact, thus closing a circuit for battery 21 which energizes the polarized relays 22 and 23 so as to throw their armatures to the left thus making a circuit for battery 24 traced as follows: from ground 28, through vibrator $a$ of oscillograph 19, switch 30', armature of relay 23, battery 24, armature of relay 22, switch 30, to the apex 26; there the current divides, part going to the cable 11 and part to the artificial line 14. Because of the interposed blocking condensers 31 and 32, no current will flow to the cable 11 and the artificial line 14 after the steady state has been reached, and, furthermore, there will not then be any unbalance current between the points 12 and 13, even if the cable 11 and the artificial line 14 are out of balance.

Upon depressing the key 20, the circuit previously traced for relays 22 and 23 is opened but their armatures remain as before until the rotating commutator 25 makes contact, thus completing another circuit from the battery 21, through said relays 22 and 23, which reverses their armatures. The commutator 25 is controlled in unison with the shutter of the oscillograph 19. The throwing of the armatures of relays 22 and 23 reverses the battery 24 in the circuit previously traced from ground 28 to apex 26. This reversal of electromotive force applied at apex 26 causes a current pulse to flow out in parallel over the cable 11 and the artificial line 14. If they are perfectly balanced, there will be no unbalance current between the points 12 and 13, but any imperfection of balance will give rise to an unbalance current between those points.

This unbalance current pulse between the points 12 and 13 flows through the primary winding of the shielded transformer 16 whose secondary goes to a multi-stage vacuum tube amplifier 17, 17'. Its output goes to the primary of a transformer 18 whose secondary is connected with the vibrator $b$ of the oscillograph 19.

This oscillograph 19 has three vibrators; $a$ serves to record the transmitted impulse, $b$ records the unbalance current corresponding to that impulse, and $c$ records 60-cycle current to serve as a time scale.

At a convenient opportunity after the installation of the cable, a set of "type unbalance curves" is prepared. For this purpose the switches 29, 29', 30, 30' and 38 are in the positions shown in Fig. 1, but the switches 33, 34, 35 and 36 are thrown so as to reduce the amplification at 17, 17'. It results that when the key 20 is depressed, the normal unbalance current between 12 and 13 will not show on the oscillograph because of the absence of amplification by means of the amplifier 17; this unbalance current will be too small to show substantially in the oscillograph record.

A series of arbitrary modifications of the impedance elements of the artificial line 14 is then made. After each such modification, the key 20 is depressed and an oscillogram is taken, the modification is removed, and another modification is made and an oscillogram taken, and so on. These impedance modifications are considerable and cause enough unbalance so that the effect shows plainly in the oscillograms even without the amplifier stage 17'. These impedance modifications are referred to as "type unbalances." They comprise all the different kinds of adjustment of which the network 14 is capable, and for each kind of adjustment they are further varied by being made at different points along the artificial line.

The resulting oscillograms for these type unbalances are then plotted systematically, the ordinates being multiplied by a proper factor to bring the maximum ordinate of each curve to a convenient unit value. The same result may be obtained by varying the magnitude of each impedance modification till the oscillogram has its maximum ordinate of unit value.

For example, the five curves shown in Fig. 2 are the "type unbalance curves" obtained in this way by a like impedance modification made, respectively, at five different points along the artificial line 14. This modification consisted in shifting the corresponding pair of contacts 37 for one of the shunt condensers. This was done at five different places and thus the five curves shown in Fig. 2 were obtained. Each of these curves is labeled with the equivalent distance to the corresponding condenser, this distance being expressed in ohms.

The curves shown in Fig. 2 may be taken as examples of a complete set of curves obtained in this way for all possible types and places of adjustment of the artificial line. As shown by this example, it is generally true that a modification of one type made at different places along the artificial line will give curves of a similar type but with different time intervals to corresponding points. This will be apparent in Fig. 2. It is also generally true that modifications of different types, even though made at the same point in the artificial line, produce different characteristic types of curves. The further out the modification is made, the longer it takes for the curves to begin to rise and the longer it takes for them to reach their maximum values, or to reach other special values. It will readily be understood that the type unbalance modification creates an unbalance current between the points 12 and 13 by introducing a reflection in the artificial line 14 for which there is no corresponding reflection in the cable 11, and the time interval represented on the time axis of Fig. 2 corresponds to the time for the impulse to go out to the point of modification and back. By the principle here involved a type unbalance curve can readily be sketched by interpolation or extrapolation with reference to other curves of the same type for different distances.

Having prepared a complete set of type unbalance curves as illustrated by the few examples in Fig. 2 for one particular type, these are arranged systematically and preserved for use when occasion arises. However, as the cable itself may change in character somewhat from time to time, the type unbalance curves may have to be revised occasionally. This is especially true after a cable has been repaired. If two type unbalances are made simultaneously, the resulting type unbalance curve will be the same as by averaging the curves corresponding to the two type unbalances made separately. This illustrates the composition of effects and justifies the procedure that will be described presently, which involves analyzing normal unbalance curves into their type components.

When it becomes desirable to adjust the artificial line 14 to improve the cable balance, the switches 33, 34, 35 and 36 are thrown to the position shown in Fig. 1 and the transmitter T and receiver R are cut off by throwing the switches 29, 29', 30, 30' and 38 to the full line positions. Then the key 20 is depressed and the commutator 25 causes a simple abrupt electromotive force reversal to be applied, properly timed in relation to the oscillograph shutter. The resulting normal unbalance current across the points 12 and 13 is greatly amplified at 17, 17' and will produce an oscillogram, for example, like the curve marked "initial unbalance" in Fig. 3. In practice, this operation is repeated several times causing several records to be exactly superimposed upon each other on the oscillographic film. This eliminates the effect of interfering currents from the cable due to natural sources, since the irregularities due to these interfering currents will fall at different times on each repetition whereas the unbalance curves will exactly coincide due to the timing feature of the commutator 25. This causes the unbalance curve to stand out and to be clearly evident. The cable is restored to service by reconnecting transmitter T and receiver R by means of switches 29, 29′, 30, 30′ and 38 and the unbalance curve is analyzed at leisure by a cut-and-try method into components drawn from the compiled chart of type unbalance curves, with the application of suitable amplitude factors in each case. The procedure is generally to find a curve that will make a close fit near the origin, make this a component and subtract it and repeat for another component. The steps are indicated by the legends on Fig. 3. Corresponding to each component type unbalance curve there is a certain adjustment on the artificial line 14. These adjustments are made for the components of Fig. 3. After such adjustment, another oscillogram may be taken. In general, this will show an unbalance current of less amplitude than before, but it may be of noticeable amplitude because it may be difficult to eliminate substantially all unbalance at one adjustment. This curve may then be analyzed the same as Fig. 3 and further adjustment made accordingly. Two or three adjustments usually suffice to reduce the unbalance to negligible proportions.

After the chart of type unbalance curves has been prepared, it will not be necessary to withhold the cable from operation more than a very short time in order to adjust its balance. This time will be merely long enough to throw the switches 29, 29′, 30, 30′ and 38 and take an oscillogram; then the switches can be connected back to the transmitter T and reeiver R and the cable can resume its normal message function. After the resulting oscillogram has been analyzed into components indicating the adjustments to be made on the line 14, these adjustments can be made while the cable is in operation. Presumably each such adjustment will only improve the operation so that there is no need to suspend operation while the adjustments are being made.

I claim:

1. The method of adjusting the balance between a signaling conductor and its artificial line, which consists in making definite impedance modifications of various types at various places along said line and in each instance applying a single standard impulse of electromotive force to said conductor and line in parallel and recording the resulting unbalance current between said conductor and line in series, then observing the normal unbalance current with the same impulse of electromotive force, but without any such impedance modification on the artificial line, and then modifying the artificial line in accordance with those records into which the normal unbalance current may be analyzed, so as to eliminate such normal unbalance.

2. The method of adjusting the balance between a signaling conductor and its artificial line, which consists in making comparatively large definite impedance modifications of various types at various places along said line and in each case applying a simple abrupt reversal of electromotive force to said conductor and line in parallel and taking an oscillogram of the resulting unbalance current between them in series, then with the same impulse, taking an oscillogram of the normal unbalance current with increased amplification, and then analyzing the last oscillogram into components drawn from the others and modifying the impedance elements of the artificial line in correspondence with these components.

3. In combination, a bridge balanced cable, an oscillograph connected with the receiving member of the bridge, means to apply a simple abrupt reversal of electromotive force in the transmitting member at the same end of the cable, and means to coordinate said reversal with the operation of the oscillograph.

4. In combination, a bridge balanced cable, an oscillograph having a shutter and electrically connected with the receiving member of the bridge, means to apply a simple abrupt reversal of electromotive force in the transmitting member at the same end of the cable, and means to coordinate said reversal with the operation of the oscillograph shutter.

5. In combination, a bridge balanced cable, an oscillograph connected with the receiving member of the bridge, an amplifier adapted to be interposed at will in the connection of oscillograph with the receiving member, means to apply a simple abrupt reversal of electromotive force in the transmitting member at the same end of the cable, and means to coordinate said reversal with the operation of the oscillograph.

6. The method of adjusting the balance between a signaling conductor and its artificial line, which consists in applying a single standard impulse of electromotive force to said conductor and line in parallel and recording the resulting unbalance current between said conductor and line in series, then analyzing the record into components corresponding to elemental modifications of the artificial line, and then modifying the artificial line in correspondence with the said components.

7. The method of adjusting the balance between a signaling conductor and its artificial line, which consists in applying a single standard impulse of electromotive force to said conductor and line in parallel and operating an oscillograph in coordination with said impulse to record the resulting unbalance current between said conductor and line in series, then analyzing the oscillograph record into components corresponding to elemental modifications of the artificial line, and then modifying the artificial line in correspondence with the said components.

8. In combination, a bridge balanced cable, an oscillograph connected with the receiving member of the bridge, and a commutator operated in coordination with the oscillograph shutter whereby a standardized electromotive force impulse may be applied in the transmitting member of the bridge at a definite position of the moving oscillograph film.

9. In testing a bridge balanced cable, the method of getting an unbalance record free from extraneous interference, which consists in repeatedly applying a standardized electromotive force impulse in the transmitting member of the bridge, each time taking an oscillogram of the current in the receiving member, and always applying the impulse at an instant corresponding to a definite angular position of the moving oscillograph film, thus superposing and accentuating the record of the component of the received current which is free from interference, and making only scattered and dim records of the components due to interference.

10. The method of adjusting a bridge balanced cable and artificial line which consists in taking it out of normal service only long enough to get an oscillogram for the received current due to a transmitted standardized electromotive force impulse at the same end of the cable, then restoring the cable to normal service, analyzing the oscillogram into components corresponding to elemental modifications of the artificial line, and making modifications of the artificial line corresponding to these components.

In testimony whereof, I have signed my name to this specification this 8th day of Dec. 1922.

HARRY W. HITCHCOCK.